(12) United States Patent
Samuel

(10) Patent No.: US 9,912,918 B2
(45) Date of Patent: Mar. 6, 2018

(54) ESTIMATING CASING WEAR

(71) Applicant: Landmark Graphics Corporation, Houston, TX (US)

(72) Inventor: Robello Samuel, Cypress, TX (US)

(73) Assignee: LANDMARK GRAPHICS CORPORATION, Houston, TX (US)

( * ) Notice: Subject to any disclaimer, the term of this patent is extended or adjusted under 35 U.S.C. 154(b) by 104 days.

(21) Appl. No.: 14/889,810

(22) PCT Filed: Jul. 3, 2013

(86) PCT No.: PCT/US2013/049295
§ 371 (c)(1),
(2) Date: Nov. 6, 2015

(87) PCT Pub. No.: WO2015/002653
PCT Pub. Date: Jan. 8, 2015

(65) Prior Publication Data
US 2016/0119591 A1    Apr. 28, 2016

(51) Int. Cl.
*G06K 9/00* (2006.01)
*H04N 7/18* (2006.01)
*E21B 47/00* (2012.01)
*E21B 21/06* (2006.01)
*E21B 21/00* (2006.01)
*E21B 44/02* (2006.01)
*G06T 7/00* (2017.01)
*G06T 7/62* (2017.01)

(52) U.S. Cl.
CPC ............. *H04N 7/185* (2013.01); *E21B 21/00* (2013.01); *E21B 21/066* (2013.01); *E21B 44/02* (2013.01); *E21B 47/0006* (2013.01); *G06T 7/0008* (2013.01); *G06T 7/62* (2017.01); *G06T 2207/30164* (2013.01); *G06T 2207/30181* (2013.01)

(58) Field of Classification Search
None
See application file for complete search history.

(56) References Cited

U.S. PATENT DOCUMENTS

| | | |
|---|---|---|
| 4,030,558 A | 6/1977 | Morris |
| 2004/0124012 A1 | 7/2004 | Dunlop et al. |
| 2006/0271299 A1 | 11/2006 | Ward et al. |
| 2007/0227225 A1 | 10/2007 | Newman |

(Continued)

FOREIGN PATENT DOCUMENTS

WO    WO-2013089683 A1    6/2013

OTHER PUBLICATIONS

Australian Government IP Australia, Patent Examination Report No. 1, dated Mar. 31, 2016, 4 pages, Australia.

(Continued)

*Primary Examiner* — Randolph I Chu

(57) ABSTRACT

Estimating casing wear. At least some of the illustrative embodiments are methods including: capturing an image comprising cuttings and casing wear particles on a shale shaker in a drilling operation, the capturing by at least one camera associated with the shale shaker; identifying casing wear particles shown in the image, the identifying by a computer system; and estimating a volume of casing wear based on the identifying.

20 Claims, 11 Drawing Sheets

(56) References Cited

U.S. PATENT DOCUMENTS

2013/0013100 A1  1/2013  Dahl
2014/0333754 A1* 11/2014  Graves ................... E21B 44/00
                                            348/85

OTHER PUBLICATIONS

International Search Report and Written Opinion, dated Mar. 20, 2014, 15 pages; Korean International Searching Authority.
A.N. Marana, I.R. Guilherme, J.P. Papa, M.V.D. Ferreira, K.Miura, SPE, F.A.C. Torres, Petrobras, An Intelligent System to Detect Drilling Problems Through Drilled Cuttings Return Analysis, Feb. 2-4, 2010, 9 pages, IADC/SPE 128916, 2010 IADC/SPE Drilling Conference and Exhibition held in New Orleans, Louisiana.
Ali Y. Garkasi, Yanghua Xiang and Gefei Liu, Casing wear in extended reach and multilateral wells, Jun. 2010, 8 pages, www.agdrilitech.com/publication-june-2010.
Monitoring Casing Condition, Sep. 24, 2010, 7 pages, http://www.wipertrip.com/casing-design/operations/544-monitoring-casing-condition.html (last accessed Nov. 16, 2015).

* cited by examiner

ESTIMATING CASING WEAR

CROSS-REFERENCE TO RELATED APPLICATIONS

This application is a U.S. National Stage patent application of International Patent Application No. PCT/US2013/049295, filed on Jul. 3, 2012, the benefit of which is claimed and the disclosure of which is incorporated herein by reference in its entirety.

BACKGROUND

In the drilling of wellbores for hydrocarbon exploration and production, a portion of the wellbore will be drilled and cased with a casing, and thereafter the length of wellbore will be extended by further drilling. During the further drilling, the drillstring extends through and contacts the casing, which contact by the drillstring may cause casing wear. Casing wear may be particularly pronounced in deviated portions of the wellbore (i.e., those portions of the wellbore that are not vertically orientated). Although some casing wear is expected, excess casing wear can adversely affect both structural integrity of a wellbore as well as the casing's ability to withstand exposure to high pressures within the casing (e.g., during hydraulic fracturing, and formation pressure).

As the length and geometrical complexity of wellbores increase with improved drilling technology, existing casing wear models cannot accurately predict casing wear.

BRIEF DESCRIPTION OF THE DRAWINGS

For a detailed description of exemplary embodiments, reference will now be made to the accompanying drawings in which.

NOTATION AND NOMENCLATURE

Figure 1:
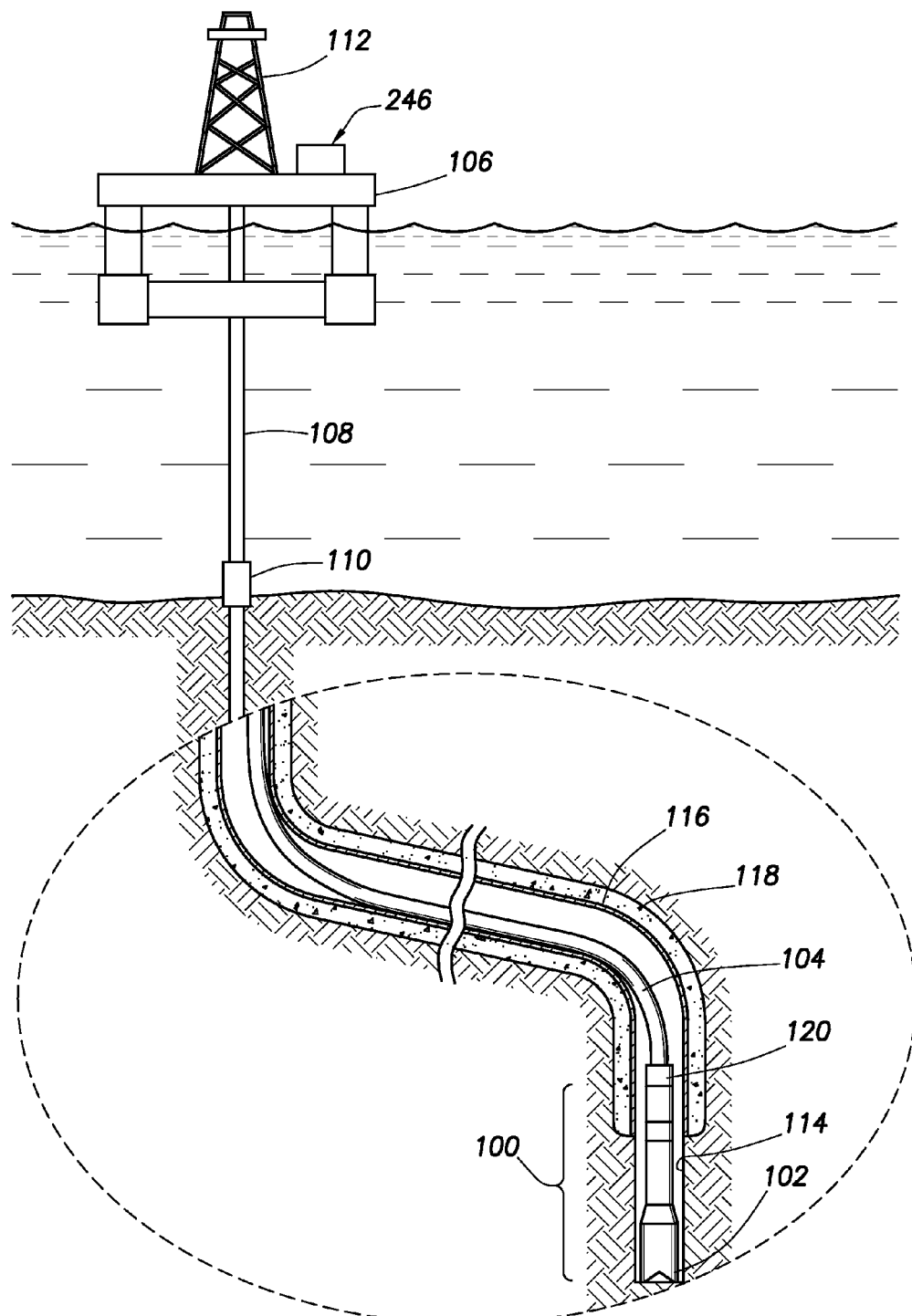
FIG. 1 is a cross-sectional partial elevation view that shows an offshore drilling system in accordance with at least some embodiments.

Certain terms are used throughout the following description and claims to refer to particular system components. As one skilled in the art will appreciate, different companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"Casing wear particle" shall mean a fragment of a casing string which has parted from the casing string as a result of the drillstring coming into contact with the casing string.

"Fishing operation" shall mean an operation which involves the removal of drilling equipment that has become stuck or lost in the wellbore and by which the equipment is retrieved by a line lowered into the borehole.

"Milling" shall mean removal material by cutting away unwanted material.

"Remote" shall mean more than one kilometer from a designated location.

"Surface," in reference to the surface of the Earth, shall mean any location starting 10 feet below the ground and extending upward relative to the local force of gravity.

"Shale shaker" shall mean a piece of drilling equipment used to remove solid material from the drilling fluid that returns from the borehole.

"Thermal image" shall mean a visual display of the amount of infrared energy emitted, transmitted, and/or reflected by an object.

"Drillstring" shall mean piping connecting the drill bit with the drilling rig, and shall include a tubing, a coiled tubing, a casing (e.g., casing-while-drilling), or a length of steel pipe.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Various embodiments are directed to methods and systems of estimating casing wear based on analyzing images which show a number of casing wear particles present at the shale shaker as cuttings and other solids emerge from the borehole during drilling. The specification first turns to a description of illustrative systems, and then provides a more detailed explanation of operation of various embodiments within the illustrative systems.

FIG. 1 shows an example subsea drilling operation. In particular, FIG. 1 shows a bottomhole assembly 100 for a subsea drilling operation, where the bottomhole assembly 100 illustratively comprises a drill bit 102 on the distal end of the drillstring 104. Various logging-while-drilling (LWD) and measuring-while-drilling (MWD) tools may also be coupled within the bottomhole assembly 100. The drillstring 104 (including the bottomhole assembly 100) is lowered from a drilling platform 106. The drillstring 104 extends through a riser 108 and a well head 110. Drilling equipment supported within and around derrick 112 (illustrative drilling equipment discussed in greater detail with respect to FIG. 2) may rotate the drillstring 104, and the rotational motion of the drillstring 104 forms the borehole 114. In the example of FIG. 1, the drillstring 104 extends through a casing string 116 illustratively held in place, at least in part, by cement 118. In the example shown the borehole 114 extends beyond the distal end of the casing 116.

In accordance with at least some embodiments, the bottomhole assembly 100 may further comprise a communication subsystem. In particular, illustrative bottomhole assembly 100 comprises a telemetry module 120. Telemetry module 120 may communicatively couple to various LWD and/or MWD tools in the bottomhole assembly 100 and receive data measured and/or recorded by the tools. The telemetry module 120 may communicate logging data to the surface using any suitable communication channel (e.g., pressure pulses within the drilling fluid flowing in the drillstring 104, acoustic telemetry through the pipes of the drillstring 104, electromagnetic telemetry, optical fibers embedded in the drillstring 104, or combinations), and likewise the telemetry module 124 may receive information from the surface over one or more of the communication channels.

Although not specifically shown in FIG. 1, the example subsea drilling operation may also comprise a system which circulates and processes drilling fluid (as will be described in more detail with respect to FIG. 2). At least a portion of the system which circulates and processes the drilling fluid may involve passing the drilling fluid through a shale shaker 246 (described in more detail below).

Figure 2:
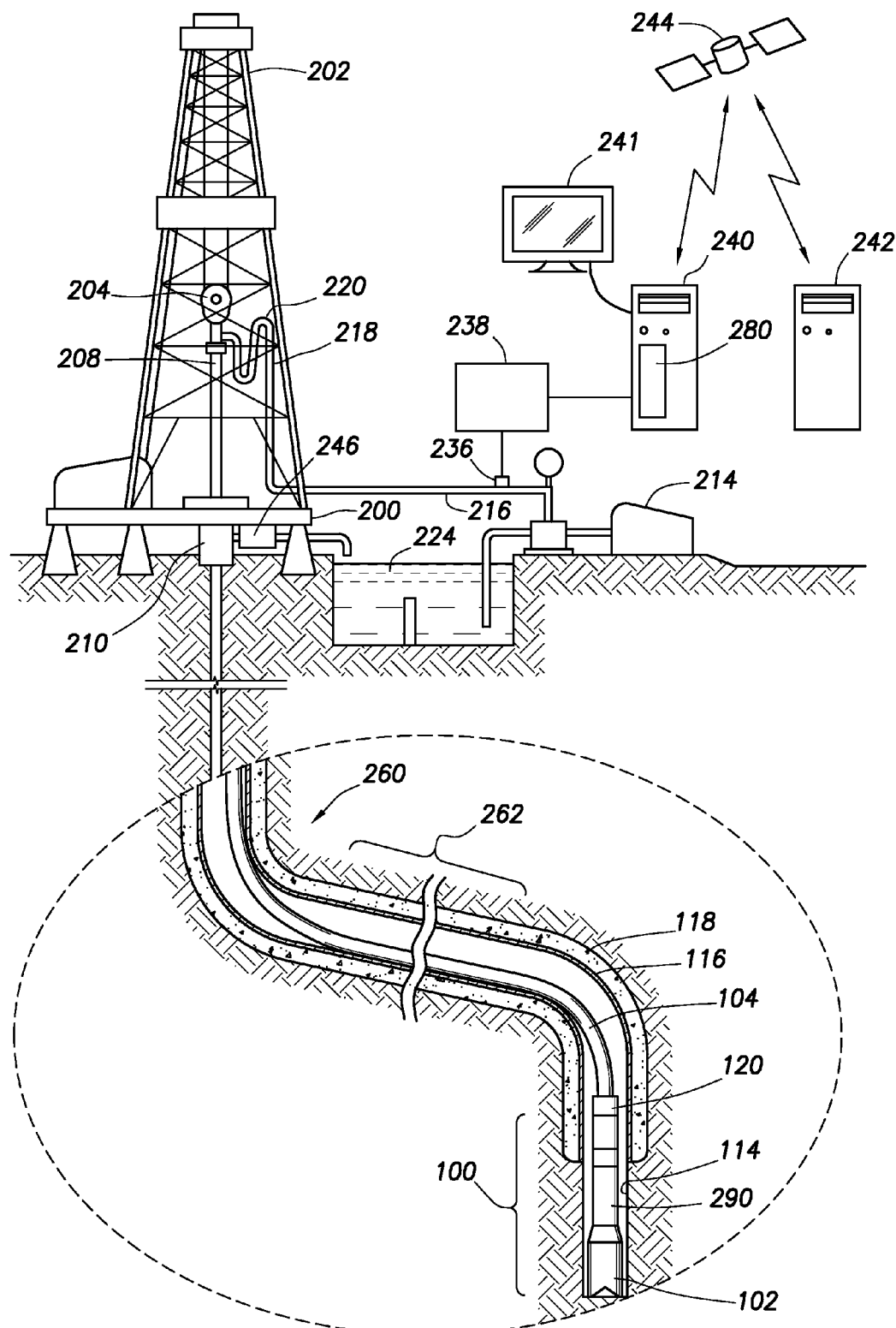
FIG. 2 is a cross-sectional partial elevation view that shows a land-based drilling system in accordance with at least some embodiments.

FIG. 2 shows an example land-based drilling operation. In particular, FIG. 2 shows a drilling platform 200 equipped with a derrick 202 that supports a hoist 204. The hoist 204 suspends a top drive 208, and the hoist 204 and top drive rotate and lower the drillstring 104 through the wellhead 210. Drilling fluid is pumped by mud pump 214 through flow line 216, stand pipe 218, goose neck 220, top drive 208, and down through the drillstring 104 at high pressures and volumes to emerge through nozzles or jets in the drill bit 102. The drilling fluid then travels back up the wellbore via the annulus, through a blowout preventer (not specifically shown), processed through a shale shaker 246 (described in more detail below) and into a mud pit 224 on the surface. On the surface, the drilling fluid is cleaned and then circulated again by mud pump 214. The drilling fluid is used to cool the drill bit 102, to carry cuttings from the base of the borehole to the surface, and to balance the hydrostatic pressure in the rock formations.

In the illustrative case of the telemetry module 120 encoding data in pressure pulses that propagate to the surface by way of the drilling fluid in the drillstring 104, transducer 236 converts the pressure signal into electrical signals for a signal digitizer 238 (e.g., an analog-to-digital converter). The digitizer 238 supplies a digital form of the pressure signals to a surface computer 240 or some other form of a data processing device. Surface computer 240 operates in accordance with software (which may be stored on a computer-readable storage medium) to monitor and control the drilling processing, including instructions to calculate or estimate casing wear (discussed more thoroughly below). The surface computer 240 is further communicatively coupled to many devices in and around the drilling site by way of digitizer 238, such as indications of the rotational speed (revolutions per minute (RPM)) of the drillstring 104 as turned by the top drive 208, and hook weight (related to weight-on-bit) as measured by devices associated with the hoist 204. The computer system 240 may also couple to, as discussed in greater detail below, a camera or camera system associated with the shale shaker 246.

In some cases, the casing wear estimations of the example embodiments may be calculated by computer system 240 and displayed on a display device 241. In yet still other example embodiments, the surface computer 240 may forward gathered data to another computer system, such as a computer system 242 at the operations center of the oilfield services provider, the operations center remote from the drill site. The communication of data between computer system 240 and computer system 242 may take any suitable form, such as over the Internet, by way of a local or wide area network, or as illustrated over a satellite 244 link. Some or all of the calculations associated with aggregate casing wear may be performed at the computer system 242, and relayed back to the surface computer 240 and display device 241.

The specification now turns to an explanation of various causes of casing wear. It is noted, however, that FIG. 2 is simplified for purposes of explanation, and the relative sizes of the various components are not drawn to scale. For example, in actual drilling the turning radius for changes in direction may be on the order 1000 feet or more, and thus the bends in the example wellbore of FIG. 2 are not shown to scale. As another example, the relative sizes of the drillstring 104 and casing 116 are exaggerated to convey certain concepts related to casing wear contemplated by the various embodiments.

Moreover, the drillstring 104, though shown as continuous, actually comprises a series of pipe sections (e.g., 30 foot sections) coupled together piece-by-piece as the drillstring is lowered into the borehole. The pipe sections that create the overall drillstring have threads on each end—one male or "pin" end with external threads and one female or "box" end with internal threads. The pin end of one drill pipe couples to the box end of the next drill pipe. In many cases, particularly cases of small outside diameter drill pipe, the box end of the pipe defines a larger cross-sectional area (i.e., has a larger diameter) than, for example, in the middle of the pipe section. Moreover, the larger diameter associated with the box end may be hardened or have a protective coating, which protective coating reduces wear on the pipe section but may accelerate casing wear. The larger diameter portions of the drill pipe may be referred to as "tool joints" in the industry.

Figure 3:
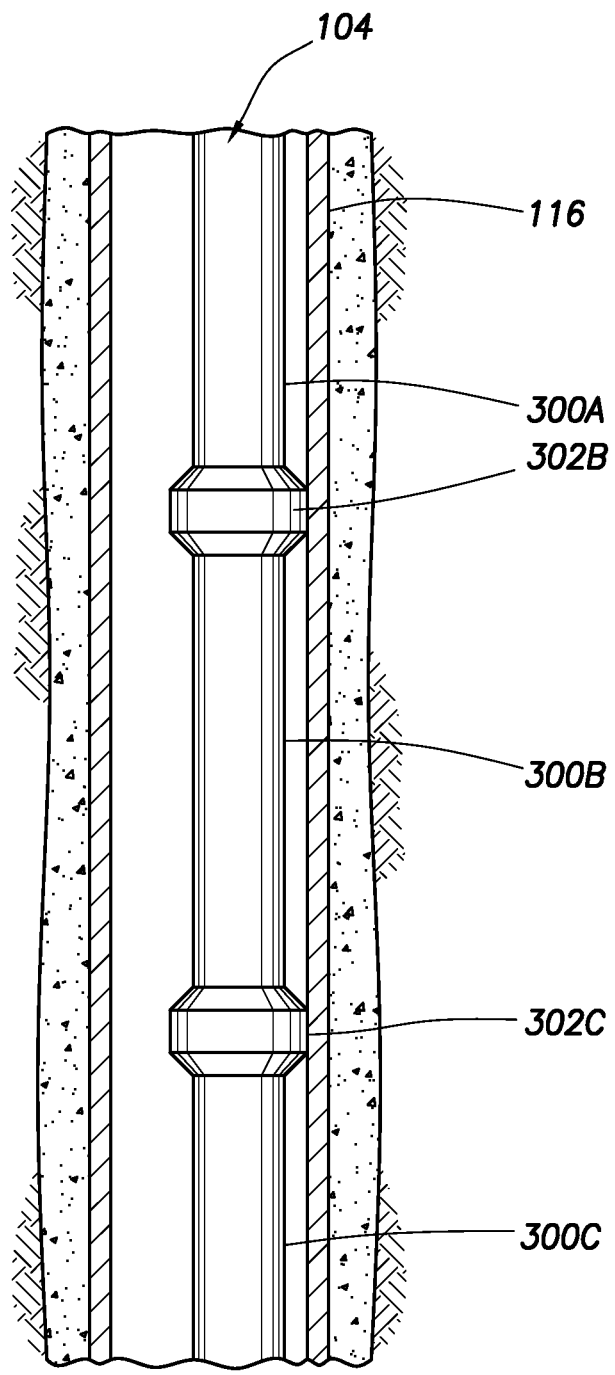
FIG. 3 is a cross-sectional elevation view that shows a drillstring within a wellbore.

FIG. 3 shows an elevation, partial cross-section, view of a portion of the drillstring 104 in a cased portion of a wellbore, along with tool joints. In particular, FIG. 3 shows a portion of the drillstring 104 where three example pipe sections 300A-C are visible. The drillstring 104 is disposed within the casing 116, and also visible is the example cement. The drillstring 104 comprises a series of tool joints, where tool joints 302B and 302C are visible in FIG. 3. Casing wear is caused predominantly by the larger diameter tool joints 302 interacting with the inside diameter of the casing 116, but may also be caused by any portion of the drillstring interacting with the casing.

In accordance with example methods and systems, casing wear at any particular location within the casing may be created by any of a plurality of tool joints creating wear based on rotation of the tool joint against and/or striking the casing, each tool joint passing the particular location at a particular time as the drillstring translates within the casing. It follows that the casing can be conceptually divided into a plurality sections or intervals, and the casing wear within each interval estimated and tracked. In some cases, the interval length for estimating and tracking casing wear may be one foot in length (e.g., the first interval extending from the surface down one foot of casing length, the second interval abutting the first interval and spanning the next foot of casing length, and interval N being N feet from the surface along the casing and spanning one foot of casing length). However, longer and shorter intervals are also contemplated, as are intervals of differing length.

The casing wear estimates calculated and provided to driller may span varying lengths and varying times. For example, the computer system may provide: an indication of the volume of casing wear that occurs within a window of time; the volume of casing wear that occurs during a drilling time; the volume of casing wear experienced for an interval or consecutive series of intervals (i.e., of a length of casing); the volume of casing wear at a measured depth; volume of casing wear (at any location) that occurs over a milling time; and the volume of casing wear (at any location) that occurs during a fishing operation.

Returning briefly to FIG. 2, FIG. 2 illustrates certain locations where the drill sting 104 may contact the inside diameter of the casing 116. In particular, at bend 260 the drillstring is shown to contact the inside radius of the casing. The contact at bend 260 may be held in place by torque on the drillstring, the torque in this case caused by the drillstring extending through the bend (as opposed to rotational torque imparted by the top drive assembly 208). As the drillstring 104 is rotated by the top drive assembly 208, the portion of the drillstring abutting and turning against the casing at the bend 260 may result in "static casing wear" in the absence of significant vibration. That is, the portion of the drillstring at the bend 260 abuts the inside diameter of the casing for multiple revolutions of the drillstring 104 and thus makes contact for an extended period of time (relative to impact casing wear, discussed more below). In the situation of bend 260, the normal force between the portion of the drillstring and the bend 260 may be perpendicular to the location of physical contact, and it follows that in this example the normal force is not aligned with gravity.

Likewise, in the long, relatively straight section 262, the drillstring 104 may be held against the lower portion of the casing 116 by the force of gravity. Thus, in this case of the straight section 262 the normal force and gravity may be at least partially aligned. As the drillstring 104 is rotated by the top drive assembly 208, the portion of the drillstring abutting and turning against the casing on the lower portion of the straight section 262 may result in static casing wear along that section.

Figure 4:
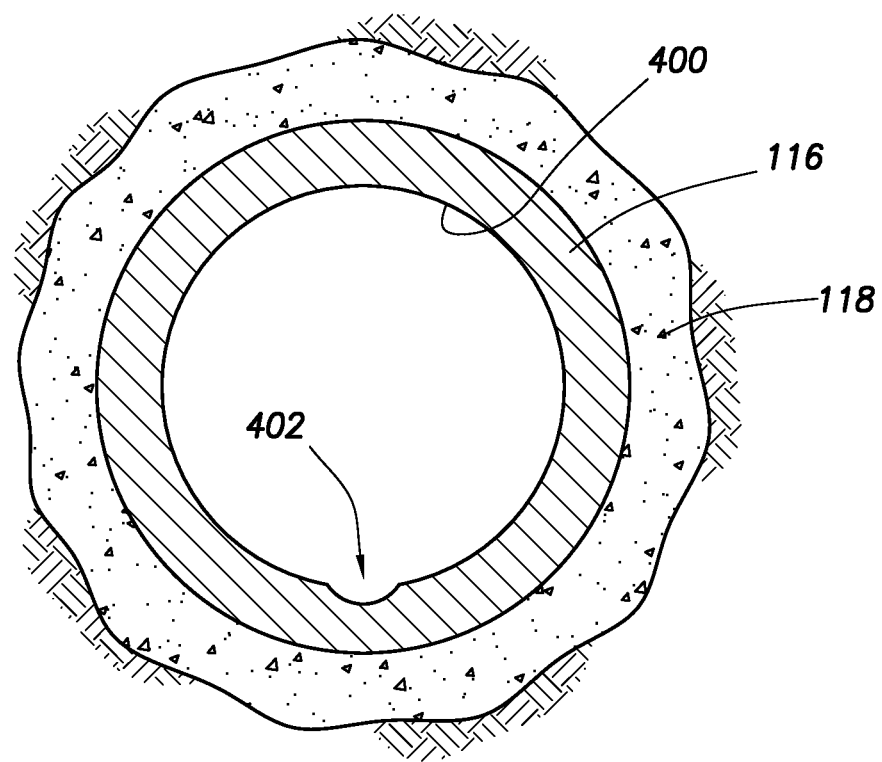
FIG. 4 is a cross-sectional end elevation view that shows example static casing wear in accordance with at least some embodiments.

FIG. 4 shows a cross-sectional end elevation view of a portion of the casing where static casing wear has taken place. In particular, FIG. 4 shows the casing 116 with the cement 118 disposed between the casing 116 and the formation. The casing 116 defines an internal diameter 400. In the example of FIG. 4, the static casing wear 402 is present in the "bottom" of the casing 116, such as might be the case in the straight section 262 where the force of gravity holds the drillstring against the lower portion of the casing. It will be understood, however, that the location of the static casing wear is not limited to just the bottom portion of the casing, and in fact may occur at any location on the inside diameter of the casing 116. However, the locations of the interaction between the drillstring 104 and the inside diameter of the casing are calculable and thus known based on the geometry of the wellbore.

In addition to the static casing wear mode, the casing may also experience casing wear associated with the rotational dynamics of the drillstring. In particular, at certain rotational speeds the drillstring 104 may experience vibration about the long axis of the drillstring 104. Moreover, because a controlled weight is applied to the drill bit 102 to achieve controlled rate of penetration during drilling, the drillstring 104 may be under compressional forces. The lack of rotational balance, alone or combination with the applied compressional force, may create vibrations in the drillstring 104 when the rotational speed of the drillstring approaches resonant frequencies (or harmonics thereof). For example, at particular rotational speeds the portion of the drillstring 104 within the straight section 262 may experience vibration resulting in sufficient force (and orientation of the force) to momentarily lift a portion drillstring 104 such that there is a lack of contact between the portion of the drillstring 104 and the casing 116. As the vibratory force rotates around to be more aligned with the force of gravity (in this example), the portion of the drillstring 104 may strike or impact the internal diameter of the casing 116. Likewise at the distal end of the drillstring 104, and particularly the bottomhole assembly 100, the bottomhole assembly 100 may experience vibration resulting in sufficient force and orientation of the force to cause the bottomhole assembly 100 to periodically impact the casing 116. It is noted that the vibratory motion caused by rotation of the drillstring 104 creating the impacts of the drillstring 104 against the casing may take place simultaneously at multiple locations along the length of the overlap between drillstring and casing. In the example situation of FIG. 2, impact caused by vibration of the drillstring may simultaneously take place in the example bend 260, in the example straight section 262, and at the distal end by way of the bottomhole assembly 100.

In addition to the vibratory motion caused by rotation of the drillstring 104, and impact of the drillstring against the inner wall of the casing, casing wear may also be affected by a plurality of matters such as: increased side force caused by the drillstring tension that occurs while drilling and back-reaming to overcome high torque and drag in the open hole; rotating times inside casing; tool joint surface characteristics; drilling fluid type; milling issues; tension; resultant side force; whether the casing wear is from a fishing operation; and the amount of dogleg severity.

Regardless of how casing wear occurs within the casing, the casing wear particles which are removed from the casing are deposited into the drilling fluid, where the drilling fluid will make its way back to the surface, and may pass through at least one shale shaker for processing. Once the drilling fluid containing casing wear particles makes its way to the shale shaker, images of the casing wear particles located among the cuttings within the drilling fluid are captured, and will be analyzed in order to estimate a volume of casing wear particles which have accumulated over some predetermined unit of measurement (e.g., length, time, etc.)

The specification now turns to an overview of the shale shaker and the image capturing system.

Returning briefly to FIG. 2, and as discussed previously, drilling fluid is pumped by mud pump 214 through flow line 216, stand pipe 218, goose neck 220, top drive 208, and down through the drillstring 104 at high pressures and volumes to emerge through nozzles or jets in the drill bit 102. The drilling fluid then travels back up the wellbore via the annulus, through a blowout preventer and is processed through a shale shaker 246, before being dumped into a mud pit 224 on the surface. The drilling fluid is used, in part, to carry cuttings and other solids, including casing wear particles which may be present, from the borehole to the surface.

A shaker, often referred to as a "shale shaker," is part of the drilling operations system which is used to separate the solid material removed from the wellbore by the drilling operation from the drilling fluid.

Figure 5A:
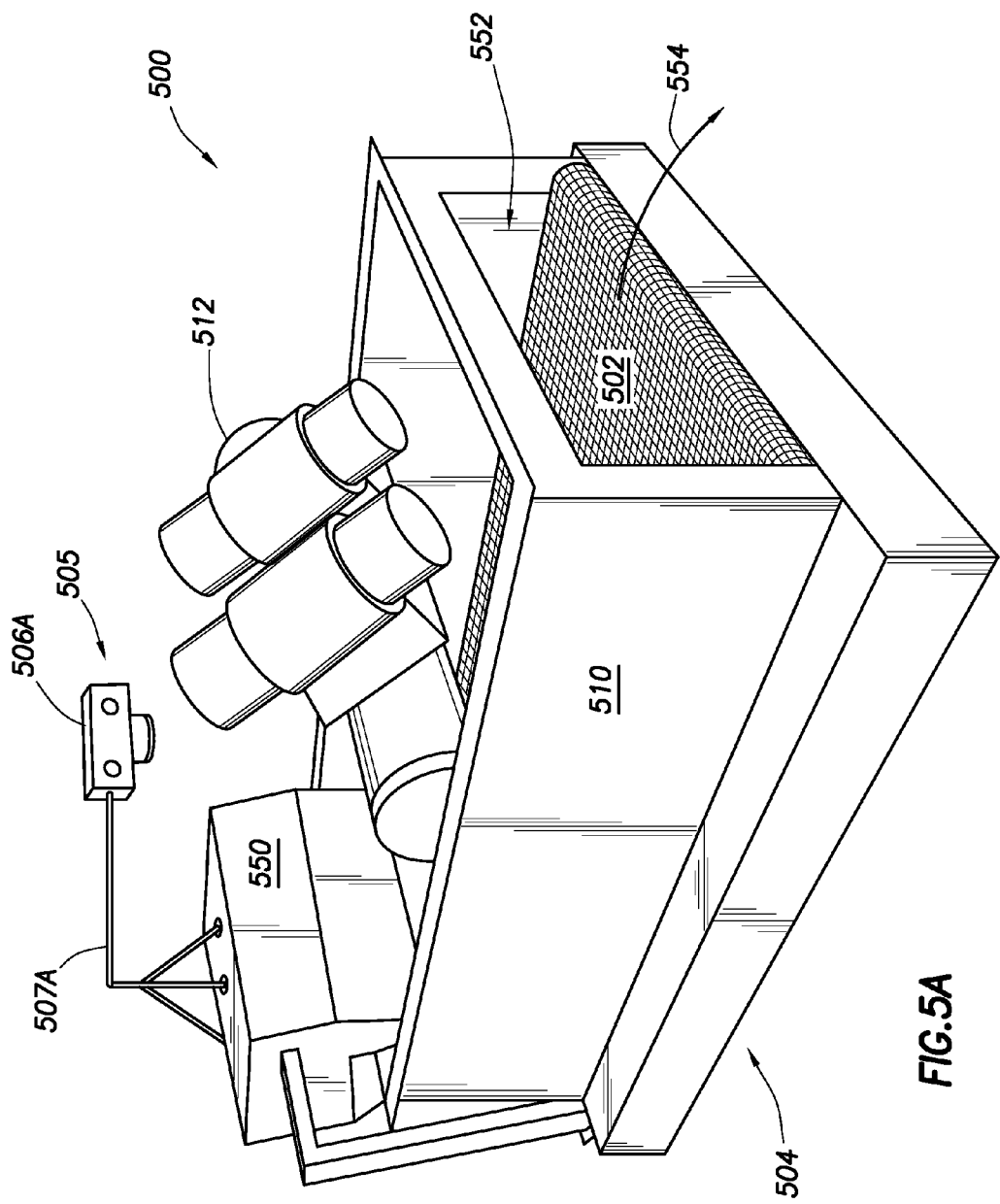
FIG. 5A is a perspective view that shows an image capture system coupled to a shale shaker in accordance with at least some embodiments.
Figure 5B:
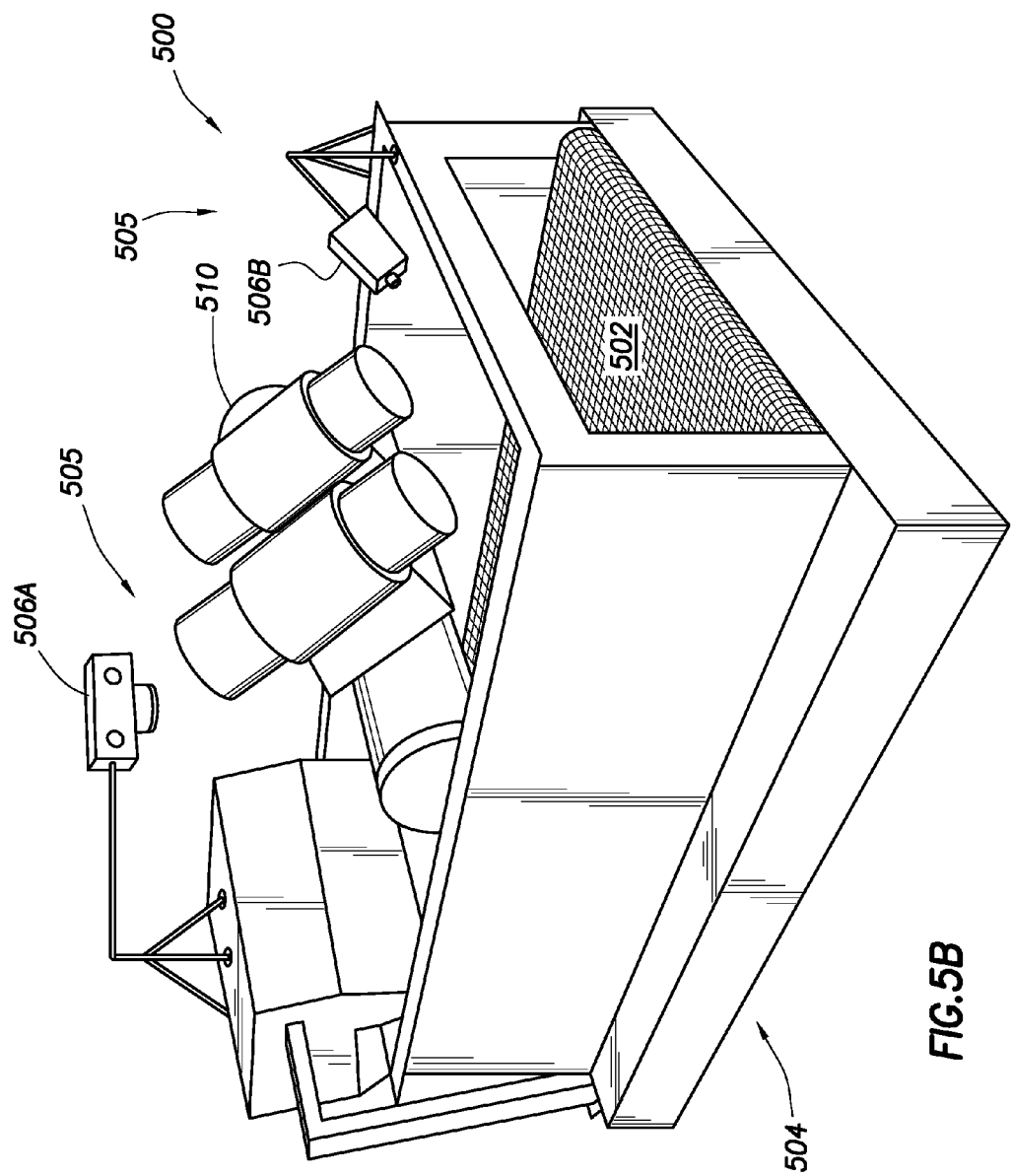
FIG. 5B is a perspective view that shows an image capture system coupled to a shale shaker in accordance with at least some embodiments.
Figure 5C:
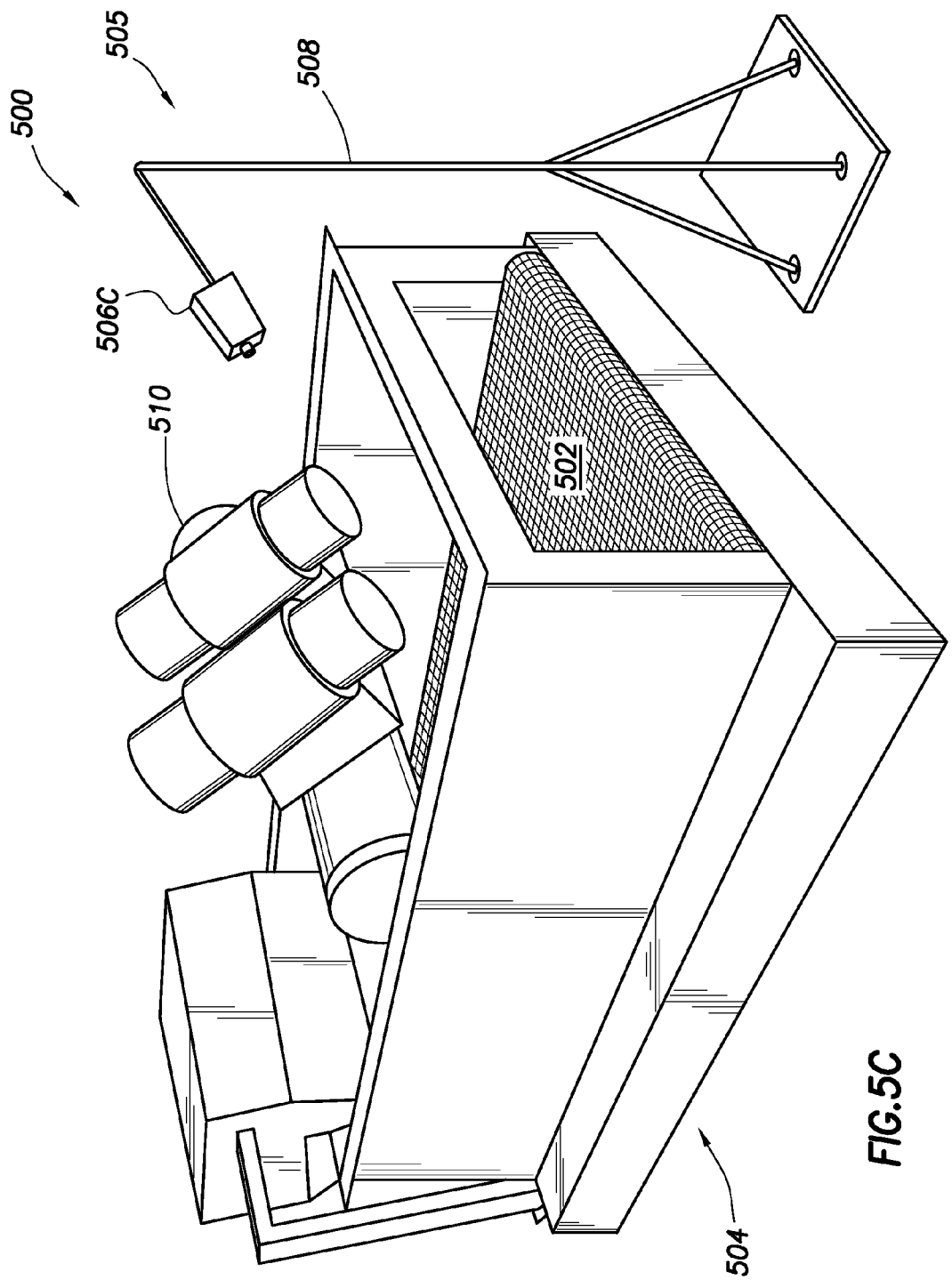
FIG. 5C is a perspective view that shows an image capture system coupled to a shale shaker in accordance with at least some embodiments.

FIGS. 5A, 5B and 5C show a perspective view of an example shale shaker coupled to an image capture system. Although a shale shaker is comprised of many more elements than are depicted in FIGS. 5A-5C, for the purposes of this discussion only the general concept of the shale shaker is discussed and thus only some elements of a shale shaker are depicted. The example shale shaker 500 comprises a stationary support frame 504 on which a vibrating assembly 510 is mounted (such as by springs that are not specifically shown). In operation, the vibrating assembly 510 is driven or vibrated by one or more motors 512. Positioned with a lower portion of the vibrating assembly 510 is one or more screens 502. Drilling fluid carrying cuttings and casing wear particles enters the vibrating assembly 510 through a distributing box 550, which distributes the drilling fluid (carrying the cuttings and casing wear particles) somewhat evenly over the screen 502. The vibratory action of the vibrating assembly 510 separates the drilling fluid from the cuttings and casing wear particles by moving cuttings and casing wear particles along the screen 502 as the drilling fluid falls through the screen 502. The drilling fluid is then returned to the mud pit while the cuttings and casing wear particles exit the screen 502 through the open end 552, as illustrated by line 554.

In order to capture images of the casing wear particles, an image capture system 505 is associated with the shale shaker 500. In the example embodiment of FIG. 5A, the image capture system 505 may be coupled to the support frame 504. In other embodiments, the image capture system 505 may be coupled to any portion of the shale shaker which enables the image capture system 505 to capture a view of the cuttings and casing wear particles as they are at least partially separated from the drilling fluid. The image capture system 505 may be alternatively coupled to another part of the drilling equipment that is not the shale shaker, while still enabling capture of an image of the cuttings and casing wear particles.

The image capture system 505 in the example system shown in FIG. 5A comprises a digital camera 506A held in place by a stand 507A coupled to support frame 504. Digital camera 506A is coupled to the shale shaker in such a way that the camera can capture images of the cuttings and casing wear particles on the screen 502 as the cuttings and casing wear particles are at least partially separated from the drilling fluid. The azimuth, elevation and rotation angle of the optical axis of the lens on the digital camera 506A may be adjusted to capture various angles and segments of the drilling fluid containing the cuttings and casing wear.

For example, in one embodiment, the digital camera 506A may be positioned so that it captures a full-frame, overhead (i.e., where the optical axis of the lens is normal to a plane defined by an upper surface of the screen 502) and view of the cuttings and casing wear particles on the screen 502. In another embodiment, the digital camera 506A may be angled such that the camera is still capable of capturing an image of the cuttings and casing wear particles on the screen, but at an angle. For example, the digital camera 506A as a whole may be positioned above the screen 502, but the digital camera 506A may be tilted to an angle of 40° (measured from an imaginary line normal to the plane defined by an upper surface of the screen 502 and the optical axis of the digital camera), thus providing an angled view of the screen 502 (or of a portion of the screen 502) as opposed to a straight down view. In yet another embodiment, the digital camera 506A may be positioned and angled in a way that it captures images of the casing wear particles at an eye level view as the cuttings and casing wear particles exit the shale shaker at the open end 552.

In yet another embodiment, as in FIG. 5B, the image capture system 505 may comprise multiple cameras, such as example cameras 506A and 506B. The cameras may be associated with the shale shaker, and may be positioned at varying locations on the shale shaker to capture images of different portions of the screen. The images may be later digitally stitched together to create a full image. In yet still another embodiment, multiple cameras may capture multiple images, where the multiple images are digitally combined to create a three-dimensional image. As with the single camera example, the azimuths, elevations and rotation angles of multiple cameras may be adjusted to capture various angles and segments of the drilling fluid containing the cuttings and casing wear.

In yet still another embodiment, as shown in FIG. 5C, the image capture system 505 may not be directly physically coupled to the shale shaker, but may comprise a stand 508 in proximity to shale shaker 504 atop which digital camera 506C is affixed. As with the examples above, the azimuth, elevation and rotation angle of camera 506C may be adjusted to capture various angles and segments of the drilling fluid containing the cuttings and casing wear.

Regardless of how many cameras are capturing the images, or the angles at which the cameras capture the images, the images are analyzed by a computer program to determine the particle distribution and to estimate the volume of the casing wear.

In one embodiment, the images captured by the digital camera(s) 506 are images created from the visual spectrum of light. In another embodiment, the images captured by the digital camera(s) 506 may be thermal images based on infrared wavelengths of light captured by the camera. In other words, any of the digital cameras may be a camera having an infrared filter or sensor which is capable of detecting the infrared radiation from the cuttings and casing wear particles on the screen 502. In the case of thermal images, various example embodiments not only identify casing wear particles based on their temperature relative to the temperature of the cuttings, but also may estimate the temperature of casing wear particles.

The images are sent, either by a wired connection or wirelessly, to a computer system running a software program which can analyze the images and calculate various data related to the casing wear particles. The computer system may be located at the drilling site (e.g., computer system 240 shown in FIG. 2) and/or the computer system may be located at a remote location, such as at an off-site operations center (e.g., computer system 242 shown in FIG. 2).

Figure 6:
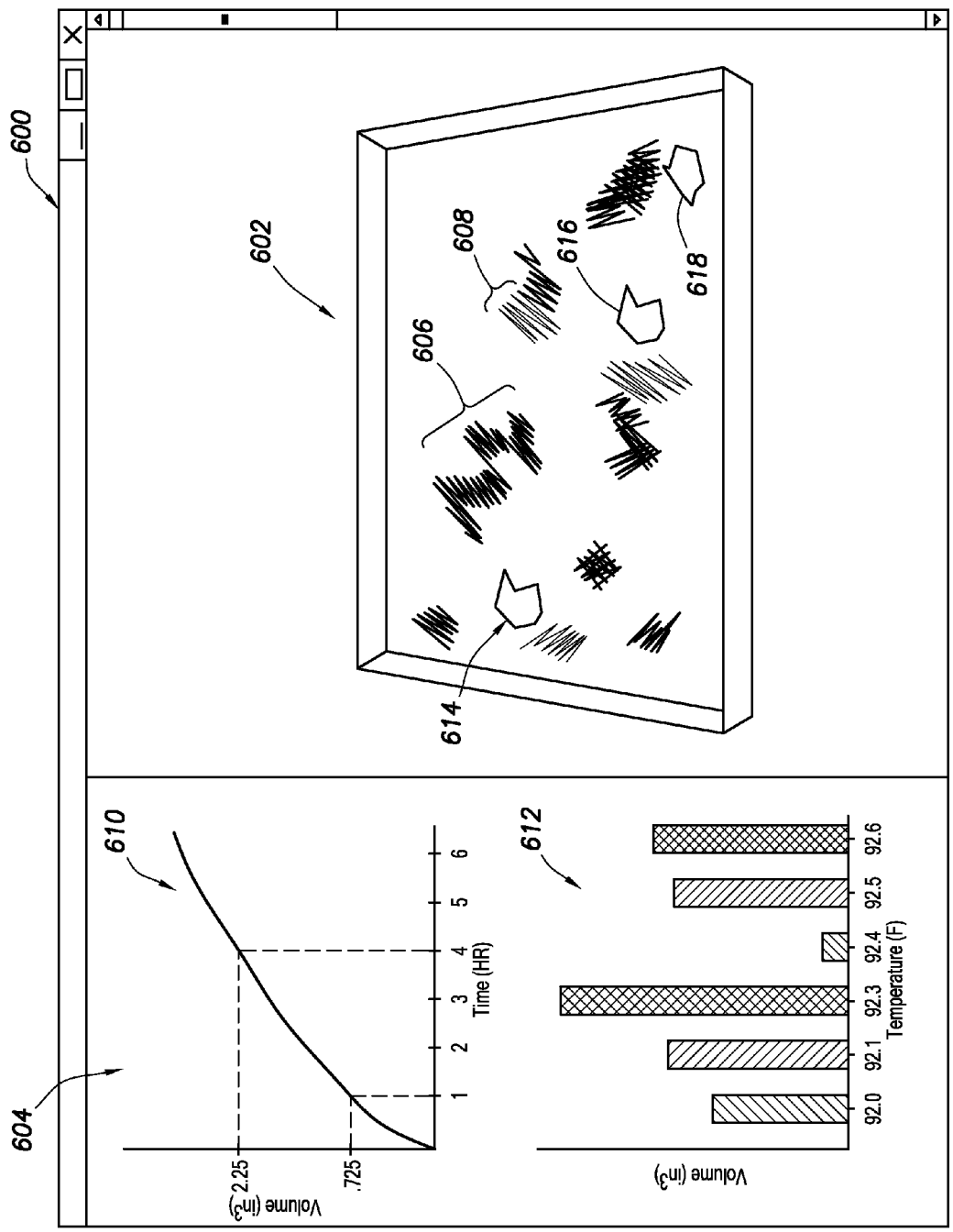
FIG. 6 is a plan view that shows an example software screenshot in accordance with at least some embodiments.

FIG. 6 shows an example screenshot of a user interface created by software running on a computer system. Any software capable of analyzing a digital image to determine particle distribution, to estimate a volume of casing wear, and to determine other casing wear parameters may be contemplated, and the discussion is not limited to the example screenshot shown in FIG. 6. FIG. 6, however, shows an example embodiment of how a drilling operator may interact with and glean information from operation of the methods and systems described herein.

In particular, FIG. 6 shows a screenshot 600 with an image 602. Image 602 shows a captured image of the cuttings and casing wear particles located on the screen of the shale shaker. In one embodiment, image 602 may be a single image, such as captured by digital camera 506. In another embodiment, image 602 may be multiple images which have been stitched together to create image 602. In yet another embodiment, the image 602 may be the result of multiple images combined to create a three-dimensional image.

Before proceeding, it is noted that the image 602 is simplified for ease of discussion. In actual operation of a shale shaker the cuttings and casing wear particles present on the screen may be several inches thick and span the entire length and width of the screen. However, so as not to unduly complicate the figure, image 602 shows only a small number of cuttings and casing wear particles such that the cuttings and casing wear particles each are easily discernible in the figure. Moreover, cuttings and casing wear particles are relatively small, and in many cases have a largest dimension on the order of about one-half millimeter to about one millimeter. However, in the example image 602 the size of cuttings and casing wear particles is exaggerated for the sake of clarity.

Keeping in mind that image 602 is simplified in one sense, and exaggerated in another sense, image 602 shows a plurality of cuttings and casing wear particles distributed over the image (and thus distributed over screen or portion of the screen). In particular, example image 602 shows a plurality of example cuttings 614, 616, and 618, and a plurality of casing wear particles 606 and 608 (as well as several casing wear particles that are unnumbered). In cases where the image 602 is an image based on wavelengths of light in the visual spectrum, casing wear particles may be identified based on the color relative to the cuttings. In the example image 602, the casing wear particles 606 and 608 are darker than the cuttings indicating the casing wear particles have a darker color than the cuttings, but depending on the formation being drilled the opposite may also be true.

In cases where the image 602 is a thermal image, casing wear particles may be identified based on temperature relative to the cuttings. In the example image 602, the casing wear particles 606 and 608 are darker than the cuttings which may indicate the casing wear particles have higher temperature than the surrounding cuttings. Furthermore, image 602 may be illustrative of only a portion of the uppermost layer of the cuttings and casing wear particles (and drilling fluid) present.

Figure 7:
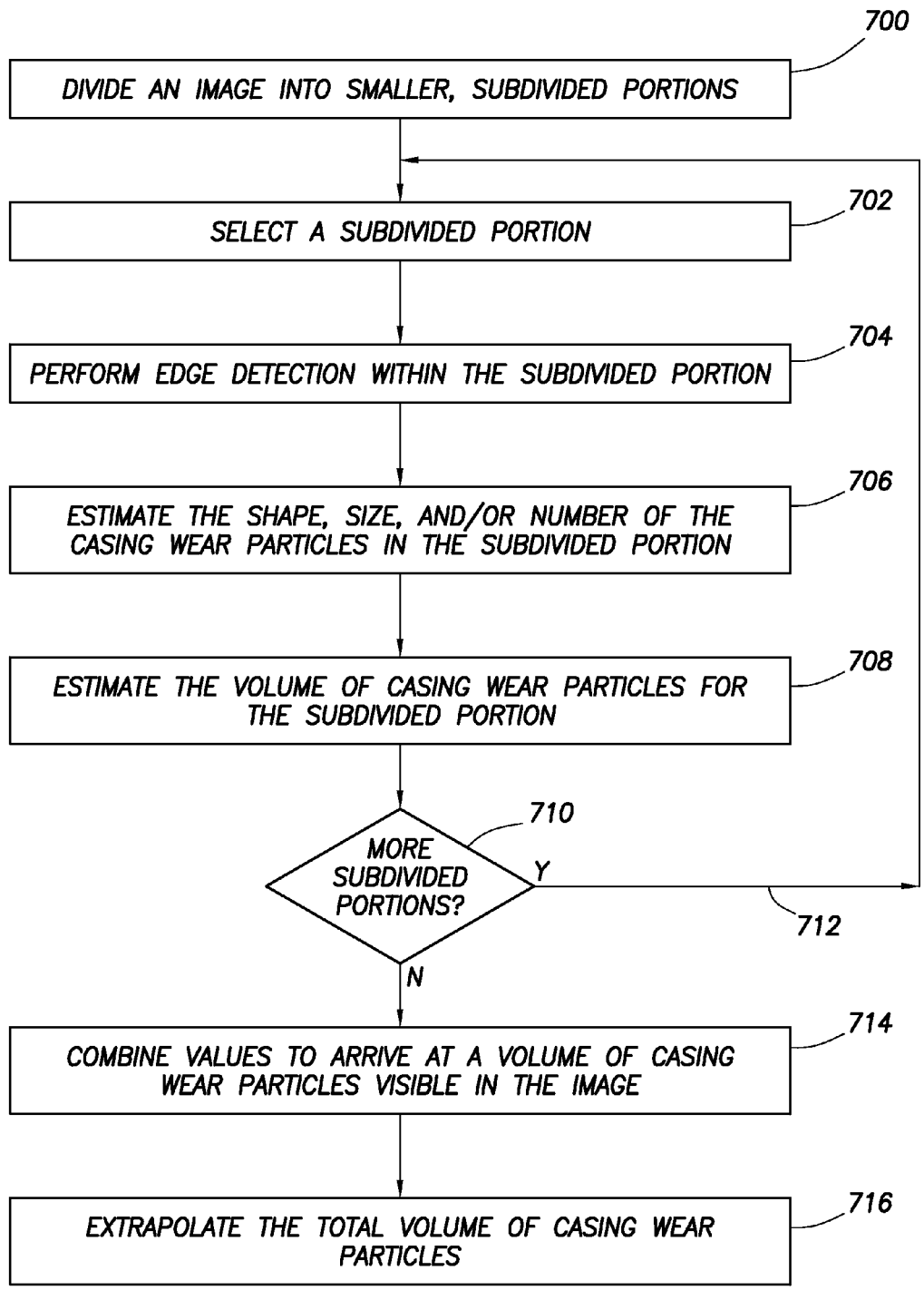
FIG. 7 is a flow diagram that shows casing wear estimation logic in accordance with at least some embodiments.

In the various embodiments, the image is applied to one or more algorithms, such as a particle distribution algorithm, in order to determine a volume of casing wear particles present in the image 602. In particular, FIG. 7 shows, in block diagram form, a flow chart of method (performed by a program running on a computer system) used to estimate a volume of casing wear particles. In particular, the example method may begin by conceptually dividing an image (e.g., image 602) into smaller, subdivided portions (block 700). Conceptually dividing the image may take many forms. If an image spans the entire screen 502, then conceptually dividing can be thought of as dividing the screen into smaller, more manageable portions. For example, if an image spans the entire area of the screen 502, and the screen 502 is 12-feet by 8-feet, the program may conceptually divide the image into sixteen 3-feet by 2-feet subdivided portions. Likewise, if an image spans less than the entire screen, appropriately sized subdivided portions may be selected.

From the subdivided portions, a particular subdivided portion is selected (block 702). Within the selected subdivided portion, an edge detection algorithm may be run to determine the edges (e.g., outline) of cuttings and casing wear particles located within the subdivided portion (block 704). In the case of an image captured from wavelengths of light in the visual spectrum, the edge detection algorithm may identify contrasts in color as edges. In the case of a thermal image, the edge detection algorithm may identify contrasts in temperature (which likewise may be discernible based on color) as edges.

Using the detected edges, the program may estimate shape, size, and/or number of the casing wear particles (block 706). That is, for each particle identified based on the detected edges, the program running on the computer system may make a determination as to whether the particle is a cutting or a casing wear particle. In the case of an image captured from wavelengths of light in the visual spectrum, casing wear particles may be identified by the color within the outline identified, or by a difference in color between various particles. For example, in some instances casing wear particles may have a darker color than surrounding cuttings. In the case of a thermal image, casing wear particles may be identified by the indicated temperature within the outline identified, or by a difference in indicated temperature between various particles. Regardless of the precise method of identifying the casing wear particles, once the casing wear particles are identified the program may determine the shape, size, and/or number of casing wear particles in subdivided portion of the image.

Based on the shape, size, and/or number of casing wear particles in the subdivided portion of the image, the example program may estimate the volume of casing wear particles visible in the subdivided portion (block 708) of the image. In the example software of FIG. 7, the estimation of volume shown by block 708 is only with respect to casing wear particles identified in the image. Volume of casing wear particles that may reside below the uppermost layer of cuttings and casing wear particles is addressed later in the example method.

Once the program has performed edge detection, shape/size/number estimations, and volume estimations for an subdivided portion of an overall image, and thus the next illustrative step is a determination as to whether further subdivided portions have yet to be analyzed (block 710). If further subdivided portions have yet to analyzed, the example algorithm returns (line 712) to selection of a subdivided portion (again, block 702) and the method is repeated for each subdivided portion. Once the volume of casing wear particles have been estimated for all the subdivided portions of the image, the program may combine the values to arrive at a volume of casing wear particles in the image (block 714).

The volume of casing wear particles in the image is only with respect to the uppermost layer of cuttings and casing wear particles on the screen, which cuttings and casing wear particles may be several inches thick. Stated otherwise, the volume of casing wear particles determined may only be with respect to the casing wear particles that are exposed (in whole or in part) on the uppermost portion of the solids on the screen. Thus, in some example methods the program may extrapolate the total volume of casing wear particles on the screen (block 716) or portion of the screen that corresponds to the image. In order to provide a more accurate volume estimation, the program may also take into account a variety of information such as: the amount of drilling time giving rise to the cuttings and casing wear particles on the screen or in the image; the volume of drilling fluid giving rise to the cuttings and casing wear particles on the screen or in the image; and/or data provided from previous drilling operations.

While the example method of FIG. 7 shows to stop with block 716, in most cases the process immediately repeats with the next image captured by the image capture system. Moreover, if a system is being used that captures multiple images of the cuttings and casing wear particles using multiple digital cameras, a method such as shown in FIG. 7 may be performed for each image captures, and the results summed to provide the overall estimation of casing wear.

In addition to providing information about the volume of casing wear particles present, the shape of the casing wear particles may provide information as to where in the casing the casing wear has occurred, or what type of action caused the casing wear. For example, if the casing wear particles are crescent shaped, the crescent shape may indicate the casing wear is caused by impact casing wear of the tool joint against the casing. Given that the locations along the drillstring where vibration is taking place are generally known, by categorizing the shape of the particles the algorithm may be able to quantify the origination location of the particle. It follows that the program, in these embodiments, may predict a casing wear at particular locations or intervals of the casing based on the shape of the casing wear particles, the number of casing wear particles, and the locations along the drillstring where the type of casing wear is taking place.

In another embodiment, the thermal image may be analyzed to provide information regarding the originating location of particular casing wear particles, and thus the volume of casing wear at the originating locations. In order to determine where casing wear may be originating based on temperature, consider the temperature gradient downhole (i.e., downhole local ambient temperature as a function of depth). More specifically, the temperature gradient downhole may be known in advance. For example, it may be known that the temperature at a depth of 10,000 feet down from the surface is 250° F. Additionally, it may be known how many degrees of temperature casing wear particles lose as the particles travel with the drilling fluid back to the surface. In other words, casing wear particles which originated at 10,000 feet, and which had a temperature of 250° F. at 10,000 feet, may cool to a temperature of 90° F. once the casing wear particles reach the shale shaker. However, casing wear particles which originate at 5,000 feet may have had a temperature of 180° F. at 5,000 feet and may have a temperature of 85° F. once the particles reach the shale shaker. Based on the temperature knowledge and the image 602 in the form of a thermal image, the computer system may be able to determine slight differences in temperature among the identified casing wear particles, and from those slight differences in temperature the computer system may be able to determine the originating location of each respective casing wear particle.

The temperatures discussed in relation thermal image and casing wear origin discussion are purely examples; the temperature gradient of the borehole may vary based on many other considerations. Likewise, the temperature of the casing wear particles as the particles reside on the screen 502 of the shale shaker 500 vary based on a number of considerations. In practice, the difference in temperature between the casing wear particles and the cuttings (and remaining drilling fluid) may be very slight, on the order of tenths or even hundredths of a degree Fahrenheit. Thus, the example temperatures of the casing wear particles given above are exaggerated to convey the idea of not only identifying casing wear particles based on their differences in temperature, but also identifying the originating location of the casing wear particles.

Referring again to FIG. 6, section 604 of the screenshot 600 shows two example informational graphs 610 and 612 related to information determined from the images captured of the casing wear particles. Example graph 610 shows an example relationship between volume of casing wear particles plotted against a time frame. For example, after one hour of drilling time, the estimated volume of casing wear particles having passed over the screen 502 of the shale shaker was 0.725 $in^3$ of particles. After an example four hours, the estimated volume of casing wear particles having passed over the screen 502 of the shale shaker was 2.25 $in^3$ of particles.

Graph 612 shows an example relationship between the estimated volume of casing wear particles with respect to a plurality of different estimated temperatures (and thus estimated depths) of those casing wear particles. In the example, for particles having an example temperature of 92.0° F., there was a volume of 0.725 $in^3$ of particles. Because the temperature of different locations within the borehole is known, as well as the rate of temperature change from each specific depth to the surface (or to the shale shaker), it is possible to determine the volume of particles from varying depths downhole. For example, the volume of casing wear in the example appears to be much more significant for casing wear particles having a temperature of 92.3° F. versus the volume of casing wear particles having a temperature of 92.4° F. The casing wear particles with a temperature of 92.4° F. may originate from a straight section of the borehole, where there is very little impact of the drillstring on the casing. However, the casing wear particles having a temperature of 92.3° F. may originate from an area of the borehole where there is high dogleg severity, and thus where the drillstring or tool joints are making frequent and/or heavy impact with the casing.

In example systems, estimations regarding the originating location of casing wear may be provided to the driller, which may result in the driller making changes to drilling parameters associated with the drilling process. That is, when excess casing wear is predicted for an interval of the casing 116, the driller and/or the computer system may make changes such as changing the rotational speed of the drillstring, changing the weight-on-bit, and/or tripping the drillstring (i.e., removing the drillstring from the casing 116) and changing a component of the bottomhole assembly and/or the drillstring. For example, a example, a portion of the bottomhole assembly 100 may be removed to change rotational vibration characteristics, or to shorten/lengthen the bottomhole assembly 100. A shorter or longer bottomhole assembly 100 may relocate the contact point of tools joints in the drillstring against the inside diameter of the casing 116.

Although two example graphs are shown in FIG. 6, any type of data analysis is possible, including graphs, charts, databases and spreadsheets. In addition, any combination of informational relationships may be contemplated, and the information is not limited solely to the relationship of volume over time or temperature over volume.

Furthermore, it is contemplated that the analysis software may be calibrated in order to provide more accurate estimations of casing wear particle volume. Although a variety of calibration techniques may be implemented, in one embodiment, calibration may take the form of measuring casing wear downhole and comparing the casing wear in the casing to the volume of casing wear particles estimated according to the present discussion. More specifically, at certain times during a drilling operation the drillstring may be removed or "tripped" to the surface. During periods when the drillstring has been removed, various wireline logging tools may be run in the borehole to measure a host of parameters. The wireline logging tool may be a "caliper tool" or a casing wall thickness tool. A wireline logging tool may be in the wellbore to measure wall thickness. In particular, a logging vehicle may be used to lower a wireline logging tool into the borehole. In most cases, the logging tool is lowered to the deepest portion of the borehole, and then pulled back to the surface at a steady rate. Logging where the wireline logging tool performs its function during the downward motion is also possible. The example wireline logging tool may measure casing wall thickness directly (e.g., based on acoustic signals incident on the casing wall) or may indirectly measure casing wall thickness (e.g., a caliper tools measuring the shape of the inside diameter of the casing).

Regardless of the precise nature of the wireline logging tool, the actual wall thickness at each interval (or oppositely the groove depth) may be determined and compared against the estimated and/or calculated volume of casing wear particles. If the estimated and/or calculated volume of casing wear particles and the volume expected from the measurements taken of the wall thickness differ, the software used to calculate the volume of casing wear particles may be adjusted.

Figure 8:
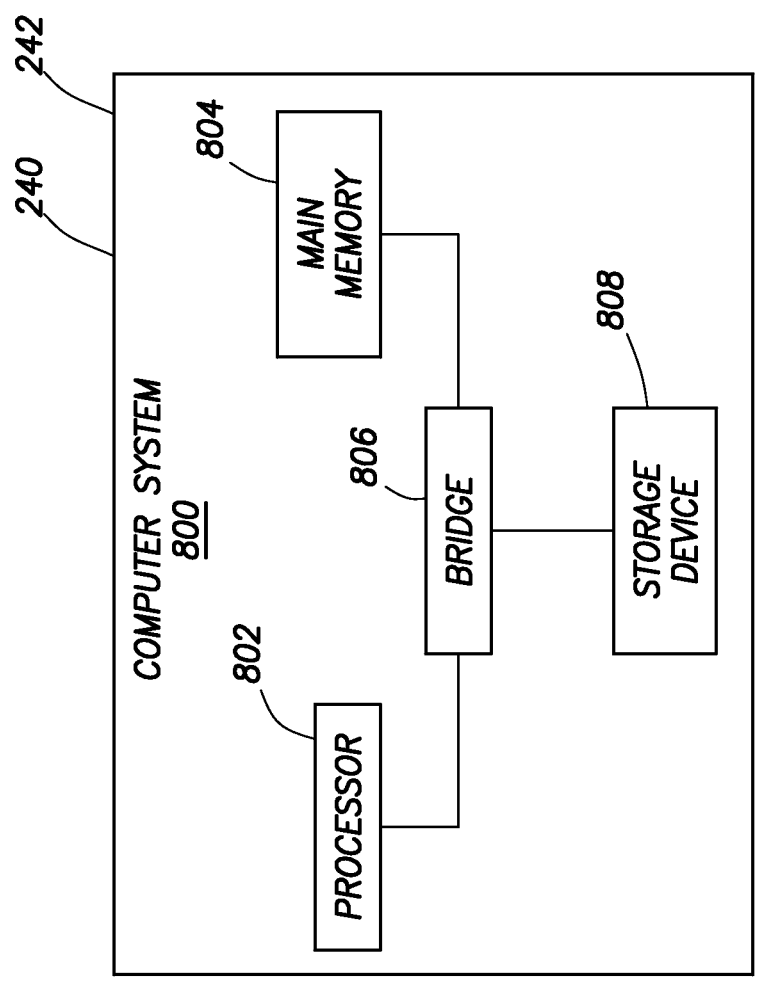
FIG. 8 is a block diagram that shows a computer system in accordance with at least some embodiments.

FIG. 8 shows a computer system 800, which is illustrative of a computer system upon which the various embodiments may be practiced. The computer system 800 may be illustrative of, for example, computer system 240. In yet another embodiment, computer system 800 may be illustrative of computer system 242. In particular, computer system 800 comprises a processor 802, and the processor couples to a main memory 804 by way of a bridge device 806. Moreover, the processor 802 may couple to a long term storage device 808 (e.g., a hard drive, solid state disk, memory stick, optical disc) by way of the bridge device 806. Programs executable by the processor 708 may be stored on the storage device 808, and accessed when needed by the processor 802. The program stored on the storage device 808 may comprise programs to implement the various embodiments of the present specification, such as estimating a volume of casing wear particles. In some cases, the programs are copied from the storage device 808 to the main memory 804, and the programs are executed from the main memory 804. Thus, the main memory 704, and storage device 808 shall be considered computer-readable storage mediums.

Figure 9:
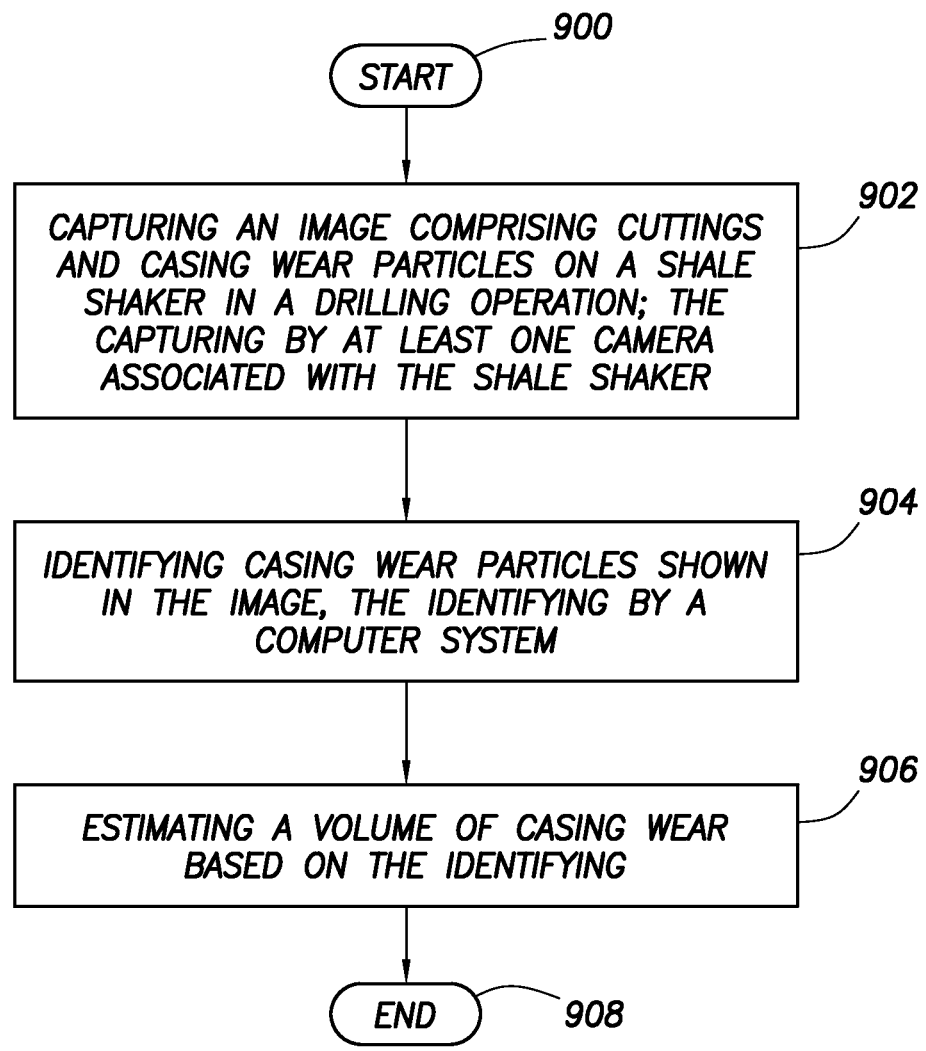
FIG. 9 is a block diagram that shows a method in accordance with at least one embodiment.

The method of estimating casing wear is discussed with respect to FIG. 9. FIG. 9 shows, in flow diagram form, a method in accordance with some embodiments. In particular, the method starts (block 900) with capturing an image comprising cuttings and casing wear particles on a shale shaker in a drilling operation, the capturing by at least one camera associated with the shale shaker (block 902); identifying casing wear particles shown in the image, the identifying by a computer system (block 904); and estimating a volume of casing wear based on the identifying (block 906). Thereafter, the method ends (908).

From the description provided herein, those skilled in the art are readily able to combine software created as described with appropriate general-purpose or special-purpose computer hardware to create a computer system and/or computer sub-components in accordance with the various embodiments, to create a computer system and/or computer sub-components for carrying out the methods of the various embodiments and/or to create a non-transitory computer-readable medium (i.e., not a carrier wave) that stores a software program to implement the method aspects of the various embodiments.

References to "one embodiment," "an embodiment," "some embodiments," "various embodiments," or the like indicate that a particular element or characteristic is included in at least one embodiment of the invention. Although the phrases may appear in various places, the phrases do not necessarily refer to the same embodiment.

It is noted that while theoretically possible to perform some or all the identification of casing wear particles, estimations of volume, and/or estimations of originating location by a human using only pencil and paper and the images, the time measurements for human-based performance of such tasks may range from man-years to man-decades, if not more. Thus, this paragraph shall serve as support for any claim limitation now existing, or later added, setting forth that the period of time to perform any task described herein less than the time required to perform the task by hand, less than half the time to perform the task by hand, and less than one quarter of the time to perform the task by hand, where "by hand" shall refer to performing the work using exclusively pencil and paper.

The above discussion is meant to be illustrative of the principles and various embodiments of the present invention. Numerous variations and modifications will become apparent to those skilled in the art once the above disclosure is fully appreciated. For example, the various embodiments have been described in terms of analyzing images of casing wear and estimating a volume of casing wear accumulated over a predetermined unit of measurement. This context, however, shall not be read as a limitation as to the scope of one or more of the embodiments described—the same techniques may be used for other embodiments. It is intended that the following claims be interpreted to embrace all such variations and modifications.

The following table provides a method in accordance with example embodiments.

TABLE 1

1. A method comprising:
capturing an image comprising cuttings and casing wear particles on a shale shaker in a drilling operation, the capturing by at least one camera associated with the shale shaker;
identifying casing wear particles shown in the image, the identifying by a computer system; and
estimating a volume of casing wear based on the identifying.
2. The method of claim 1 wherein estimating further comprises estimating at least one selected from the group consisting of: volume of casing wear that occurs within a window of time; volume of casing wear that occurs during a drilling time; volume of casing wear experienced for a length of casing; volume of casing wear at a measured depth; volume of casing wear that occurs over a milling time; and volume of casing wear that occurs during a fishing operation.
3. The method of claim 1 wherein capturing further comprises capturing a thermal image.
4. The method of claim 1 further comprising estimating an originating location of the casing wear particles within a casing.
5. The method of claim 4 wherein estimating the originating location further comprises estimating based on at least one selected from the group consisting of: temperature of the casing wear particles; shape of the casing wear particles; and size of the casing wear particles.
6. The method of claim 4 wherein estimating the originating location further comprises determining a temperature of the casing wear particles.
7. The method of claim 1 wherein capturing further comprises capturing a plurality of images.
8. The method of claim 7 wherein capturing the plurality of images further comprises capturing by way of multiple cameras.
9. The method of claim 1 further comprising changing a drilling parameter responsive to the volume of casing wear estimated.

TABLE 1-continued

10. The method of claim 9 wherein changing the drilling parameter further comprises changing at least one selected from the group consisting of: weight-on- bit; rotational speed of a drillstring; and a component of a bottomhole assembly.

This table shall serve as the basis for post-filing claim amendments.

The following table provides a system in accordance with example embodiments.

TABLE 2

11. A system comprising:
a camera associated with a shale shaker;
a processor coupled to the camera;
a memory coupled to the processor, the memory storing a program that, when executed by the processor, causes the processor to:
receive an image comprising cuttings and casing wear particles on a shale shaker in a drilling operation;
identify casing wear particles shown in the image; and
estimate a volume of casing wear based on the identifying.
12. The system of claim11 wherein the camera is coupled to the shale shaker.
13. The system of claim 11 wherein the camera is coupled to a piece of drilling equipment located in proximity to the shale shaker.
14. The system of claim 11 wherein when the processor estimates the volume, the program further causes the processor to estimate at least one selected from the group consisting of: volume of casing wear that occurs within a window of time; volume of casing wear that occurs during a drilling time; volume of casing wear experienced for a length of casing; volume of casing wear at a measured depth; volume of casing wear that occurs over a milling time; and volume of casing wear that occurs during a fishing operation.
15. The system of claim 11 wherein when the processor receives, the program further causes the processor to receive a thermal image.
16. The system of claim 11 wherein when the processor estimates, the program further causes the processor to estimate an originating location of the casing wear particles within a casing.
17. The system of claim 16 wherein when the processor estimates the originating location, the program further causes the processor to estimate based on at least one selected from the group consisting of: temperature of the casing wear particles; shape of the casing wear particles; and size of the casing wear particles.
18. The system of claim 16 wherein when the processor estimates the originating location, the program further causes the processor to determine a temperature of the casing wear particles.
19. The system of claim 11 wherein the program further causes the processor to change a drilling parameter during drilling, the change responsive to the volume of casing wear particles.

This table shall serve as the basis for post-filing claim amendments.

The following table provides a computer-readable medium in accordance with example embodiments.

TABLE 3

20. A non-transitory computer-readable medium storing a program that, when executed by a processor, causes the processor to:
receive an image comprising cuttings and casing wear particles on a shale shaker in a drilling operation;
identify casing wear particles located within the image;
estimate a volume of casing wear based on the identifying.
21. The non-transitory computer-readable medium of claim 20 wherein when the program estimates the volume, the program further causes the processor to estimate at least one selected from the group consisting of: volume of casing wear that occurs within a window of time; volume of casing wear that occurs during a drilling time; volume of casing wear experienced for a length of casing; volume of casing wear at a measured depth; volume of casing wear that occurs over a milling time; and volume of casing wear that occurs during a fishing operation.
22. The non-transitory computer-readable medium of claim 20 wherein when the program receives the image, the program further causes the processor to receive a thermal image.
23. The non-transitory computer-readable medium of claim 20 wherein when the program estimates, the program further causes the processor TABLE 3-continued to estimate an originating location of the casing wear particles within a casing.
24. The non-transitory computer-readable medium of claim 23 wherein when the program estimates, the program further causes the processor to estimate based on least one selected from the group consisting of: temperature of the casing wear particles; shape of the casing wear particles; and size of the casing wear particles.
25. The non-transitory computer-readable medium of claim 23 wherein when the program estimates the originating location, the program further causes the processor to determine a temperature of the casing wear particles.
26. The non-transitory computer-readable medium of claim 20 wherein the program further causes the processor to change a drilling parameter during drilling, the change responsive to the volume of casing wear particles.

This table shall serve as the basis for post-filing claim amendments.

What is claimed is:

1. A method comprising:
receiving, by a computer system, an image captured by at least one camera associated with a shale shaker, the image comprising cuttings and casing wear particles on the shale shaker in a drilling operation;
identifying, by the computer system, casing wear particles shown in the image;
estimating an originating location of the identified casing wear particles within a casing;
estimating a volume of casing wear expected at the originating location of the casing wear particles;
changing a drilling parameter responsive to the estimated volume of casing wear; and
drilling a wellbore through a formation according to the changed drilling parameter.

2. The method of claim 1 wherein estimating further comprises estimating at least one selected from the group consisting of: volume of casing wear that occurs within a window of time; volume of casing wear that occurs during a drilling time; volume of casing wear experienced for a length of casing; volume of casing wear at a measured depth; volume of casing wear that occurs over a milling time; and volume of casing wear that occurs during a fishing operation.

3. The method of claim 1 wherein the image captured by the camera is a thermal image.

4. The method of claim 1, wherein estimating the originating location further comprises estimating based on at least one selected from the group consisting of: temperature of the casing wear particles; shape of the casing wear particles; and size of the casing wear particles.

5. The method of claim 1, wherein estimating the originating location further comprises determining a temperature of the casing wear particles.

6. The method of claim 1, wherein capturing further comprises capturing a plurality of images.

7. The method of claim 6 wherein capturing the plurality of images further comprises capturing by way of multiple cameras.

8. The method of claim 1, wherein the drilling parameter is selected from the group consisting of: weight-on-bit; rotational speed of a drillstring; and a component of a bottomhole assembly.

9. A system comprising:
a camera associated with a shale shaker;
a processor coupled to the camera;
a memory coupled to the processor, the memory storing a program that, when executed by the processor, causes the processor to:

receive an image captured by the camera, the image comprising cuttings and casing wear particles on a shale shaker in a drilling operation;
identify casing wear particles shown in the image;
estimate an originating location of the identified casing wear particles within a casing;
estimate a volume of casing wear expected at the originating location of the casing wear particles;
change a drilling parameter responsive to the estimated volume of casing wear; and
drill a wellbore through a formation according to the changed drilling parameter.

10. The system of claim 9 wherein the camera is coupled to the shale shaker.

11. The system of claim 9 wherein the camera is coupled to a piece of drilling equipment located in proximity to the shale shaker.

12. The system of claim 9, wherein when the processor estimates the volume, the program further causes the processor to estimate at least one selected from the group consisting of: volume of casing wear that occurs within a window of time; volume of casing wear that occurs during a drilling time; volume of casing wear experienced for a length of casing; volume of casing wear at a measured depth; volume of casing wear that occurs over a milling time; and volume of casing wear that occurs during a fishing operation.

13. The system of claim 9, wherein the image is a thermal image.

14. The system of claim 9, wherein when the processor estimates the originating location, the program further causes the processor to estimate based on at least one selected from the group consisting of: temperature of the casing wear particles; shape of the casing wear particles; and size of the casing wear particles.

15. The system of claim 9, wherein when the processor estimates the originating location, the program further causes the processor to determine a temperature of the casing wear particles.

16. A non-transitory computer-readable medium storing a program that, when executed by a processor, causes the processor to:
receive an image captured by a camera associated with a shale shaker, the image comprising cuttings and casing wear particles on the shale shaker in a drilling operation;
identify casing wear particles located within the image;
estimate an originating location of the identified casing wear particles within a casing;
estimate a volume of casing wear expected at the originating location of the casing wear particles;
change a drilling parameter responsive to the estimated volume of casing wear; and
drill a wellbore through a formation according to the changed drilling parameter.

17. The non-transitory computer-readable medium of claim 16 wherein when the program estimates the volume, the program further causes the processor to estimate at least one selected from the group consisting of: volume of casing wear that occurs within a window of time; volume of casing wear that occurs during a drilling time; volume of casing wear experienced for a length of casing; volume of casing wear at a measured depth; volume of casing wear that occurs over a milling time; and volume of casing wear that occurs during a fishing operation.

18. The non-transitory computer-readable medium of claim 16, wherein the image is a thermal image.

19. The non-transitory computer-readable medium of claim 16, wherein when the program estimates, the program further causes the processor to estimate based on least one selected from the group consisting of: temperature of the casing wear particles; shape of the casing wear particles; and size of the casing wear particles.

20. The non-transitory computer-readable medium of claim 16, wherein when the program estimates the originating location, the program further causes the processor to determine a temperature of the casing wear particles.

* * * * *

UNITED STATES PATENT AND TRADEMARK OFFICE
CERTIFICATE OF CORRECTION

PATENT NO. : 9,912,918 B2  
APPLICATION NO. : 14/889810  
DATED : March 6, 2018  
INVENTOR(S) : Robello Samuel Page 1 of 1

It is certified that error appears in the above-identified patent and that said Letters Patent is hereby corrected as shown below:

In the Specification

Column 1, Line 8 change "2012" to -- 2013 --

Signed and Sealed this  
Twenty-second Day of May, 2018

Andrei Iancu  
*Director of the United States Patent and Trademark Office*